United States Patent [19]
Kitai et al.

[11] 4,205,908
[45] Jun. 3, 1980

[54] SELFTIMER ON CAMERA

[75] Inventors: Kiyoshi Kitai; Eiichi Onda; Masanori Watanabe, all of Shikawatashi, Japan

[73] Assignee: Seiko Koki Kabushiki Kaisha, Japan

[21] Appl. No.: 973,587

[22] Filed: Dec. 27, 1978

[30] Foreign Application Priority Data

Dec. 28, 1977 [JP] Japan .................................. 52-158409

[51] Int. Cl.$^2$ .............................................. G03B 9/64
[52] U.S. Cl. ................................................... 354/239
[58] Field of Search ........ 354/266, 267, 226, 236–239, 354/234–252

[56] References Cited

U.S. PATENT DOCUMENTS

| | | | |
|---|---|---|---|
| 2,387,574 | 10/1945 | Gehmlich | 354/239 |
| 3,103,862 | 9/1963 | Kiper et al. | 354/239 |
| 3,194,140 | 7/1965 | Winkler et al. | 354/239 |
| 3,852,785 | 12/1974 | Ogihara et al. | 354/267 X |
| 4,051,501 | 9/1977 | Inove et al. | 354/239 |

Primary Examiner—Donald A. Griffin
Attorney, Agent, or Firm—Robert E. Burns; Emmanuel J. Lobato; Bruce L. Adams

[57] ABSTRACT

A camera shutter equipped with a selftimer device has an interlocking member for coordinating the movement of the camera operating member and the selftimer device to obtain accurate operation of the shutter release member. The interlocking member has a first arm which engages with the operating member during movement thereof at the beginning portion of the shutter release motion and the operating member thereafter drives the interlocking member to a position in which the interlocking member actuates the selftimer device to initiate a timing operation. Near the end of the timing operation, the selftimer device engages with a second arm of the interlocking member and thereafter drives the interlocking member to another position during the course of which a translating lever mounted on the interlocking member actuates the shutter release member to initiate release of the shutter.

6 Claims, 3 Drawing Figures

SELFTIMER ON CAMERA

BACKGROUND OF THE INVENTION

This invention relates to a selftimer device on a camera, and more particularly to a selftimer device suitable to a single lens reflex camera wherein an image produced by incident rays through the lens and reflected by the mirror is observed in the viewfinder before actuating the shutter and the mirror is withdrawn upwardly before starting the shutter at the shutter releasing operation.

In the conventional selftimer of this type, it is usual to provide two retaining hooks for retaining the shutter driving member at two different positions. When the selftimer is used, the shutter driving member is started by releasing the first retaining hook by shutter releasing motion or by the action of a member actuated by shutter releasing motion, then retained again by the second retaining hook after a fixed stroke. This fixed stroke of the shutter driving member serves as a signal to start the selftimer device. The second retaining hook is released at the final stage of operation of the selftimer device so that the shutter is started. According to this construction, variation of the speed of the shutter driving member due to different starting positions depending on use or not use of the selftimer device causes inaccurate shutter speed. Furthermore, this construction is disadvantageous in productivity and manufacturing cost because of the delicate mechanism employing the fractional stroke of the driving member as selftimer starting signal.

An object of the present invention is to provide a selftimer device for a camera which overcomes the abovementioned drawbacks and disadvantages.

BRIEF DESCRIPTION OF THE DRAWINGS

In FIG. 1 the selftimer is shown in the disenabled state while in FIG. 2 the selftimer is shown in the enabled or charged state.

DETAILED DESCRIPTION OF INVENTION

Figure 1:
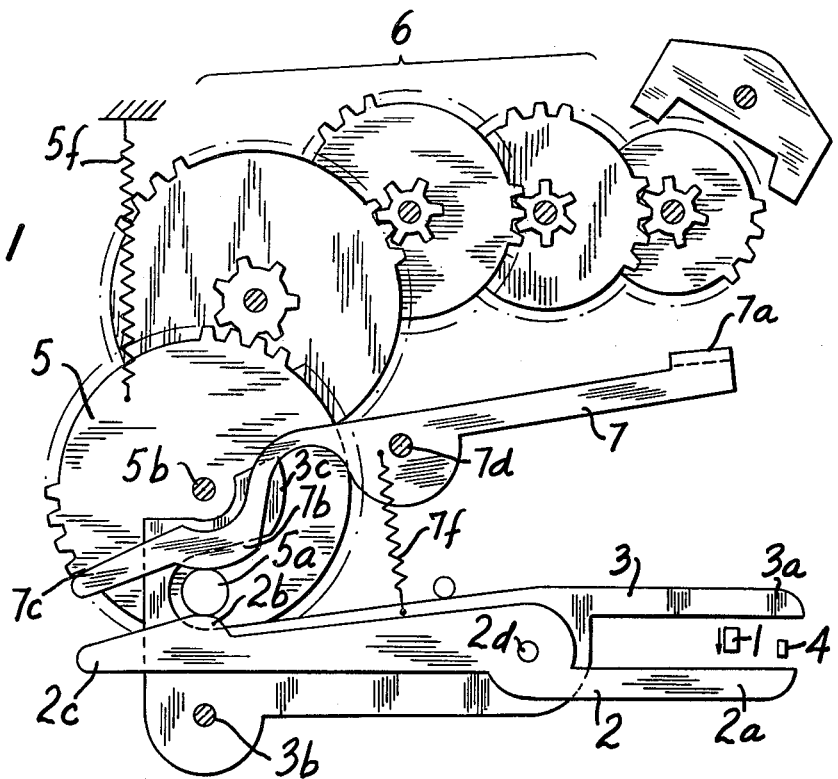
FIGS. 1 and 2 illustrate a first embodiment of the present invention.
Figure 2:
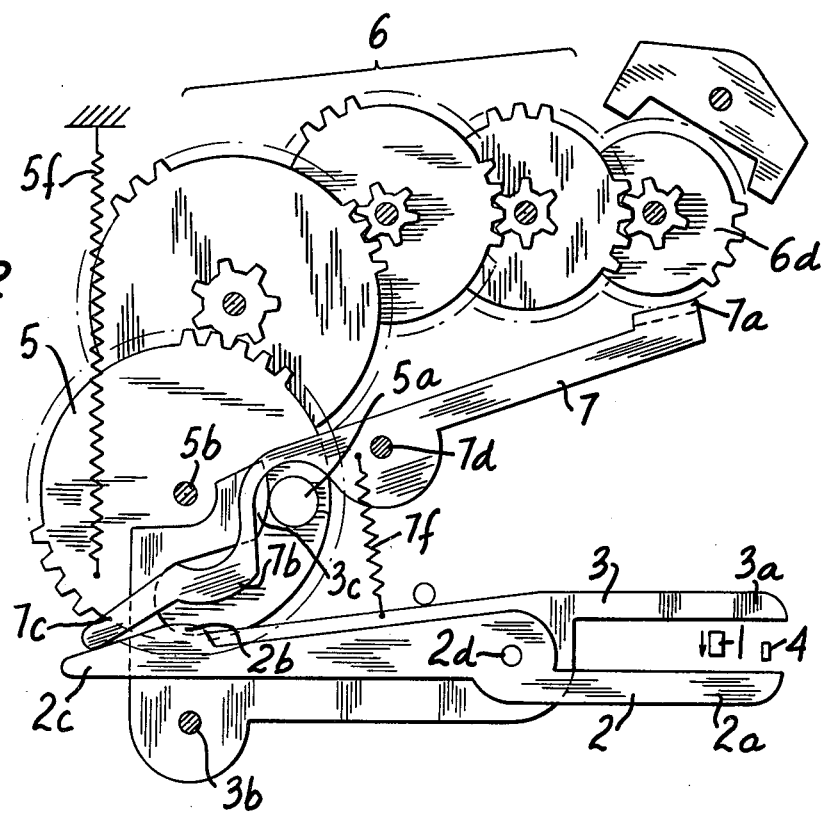

FIGS. 1 and 2 illustrate a first embodiment of the present invention. In FIG. 1 the selftimer is disenabled while in FIG. 2 the selftimer is charged and enabled. Referring to the drawings, an operating member 1 is moved within a fixed range during the shutter release motion. An interlocking lever 2 having three arms 2a, 2b and 2c is rotatably fitted on a pin 2d fixed on a translating lever 3 having two arms 3a and 3c, rotatably fitted on a pin 3b and strained counterclockwise by a spring 7f. A release member 4 starts the shutter operation. A first wheel 5 of the selftimer having a pin 5a is rotatably fitted on a pin 5b and strained clockwise by a spring 5f. A delay governor 6 is of well known construction. A stop lever 7 having a curved portion 7a, a cam portion 7b and an arm 7c, is rotatably fitted on a pin 7d and strained counterclockwise by a spring 7f retain the delay governor 6.

First, explanation will be made of the motion of the aforesaid mechanism with the selftimer in its disenabled state. Starting from the state as shown in FIG. 1, the operating member 1 is moved in the direction shown by an arrow by the shutter releasing motion and pushes the interlocking lever 2 at the arm 2a. The interlocking lever 2 rotates clockwise about the supporting point made up of the contact of the arm 2b and the pin 5a of the first wheel 5 and pushes the translating lever 3 clockwise by the pin 2d so that the arm 3a of the translating member 3 pushes the release lever 4 to start the operation of the shutter. The mechanism is reset to the initial state as shown by FIG. 1 by returning the operating member 1 to the initial position by the interlocking motion of film winding-up or by a shutter operation completion signal.

Explanation will be made of the motion of the mechanism when the selftimer is enabled for operation. Starting from the state as shown in FIG. 2, the operating member 1 is moved in the direction shown by an arrow by the shutter releasing motion and pushes the interlocking lever 2 at the arm 2a. Consequently, the interlocking lever 2 rotates clockwise about the pin 2d so that the arm 2c pushes the stop lever 7 at the arm 7c turning the stop lever 7 clockwise to release the engagement of the curved portion 7a with the wheel 6d of the delay device 6, then the selftimer device is started because the first wheel 5 beings rotating clockwise by the spring force applied by the spring 5f under the speed control of the delay device 6. When the pin 5a of the first wheel 5 comes into the final operating range after a predetermined selftimer operating time, the pin 5a pushes the interlocking lever 2 at the arm 2b to turn the interlocking lever 2 counterclockwise about the supporting point made up of the contact of the arm 2a and the operating member 1 so that the translating lever 3 connected with the interlocking lever 2 by the pin 2d is turned clockwise to start the shutter operation by pushing the shutter release member 4 by the arm 3a of the translating lever 3. The mechanism is reset to the initial state as shown by FIG. 1 by returning the operating plate 1 to the initial position by the interlocking motion of film winding-up or by a shutter operation completion signal.

The engagement of the arm 3c of the translating lever 3 with the pin 5a of the first wheel 5 when the selftimer is charged prevents errorneous clockwise rotation, against the spring force applied by the spring 7f, of the translating lever supporting the interlocking lever 2 when the camera is shocked or vibrated or when the operating member 1 strikes violently against the interlocking lever 2.

Furthermore, the distance between the arm 3a of the translating lever 3 and the operating member 1 being smaller than the distance between the arm 3a and the shutter releasing member 4, the arm 3a of the translating lever 3 is prevented from errorneously pushing the shutter releasing member 4 limited by the operating member 1 if the camera is shocked or vibrated.

Figure 3:
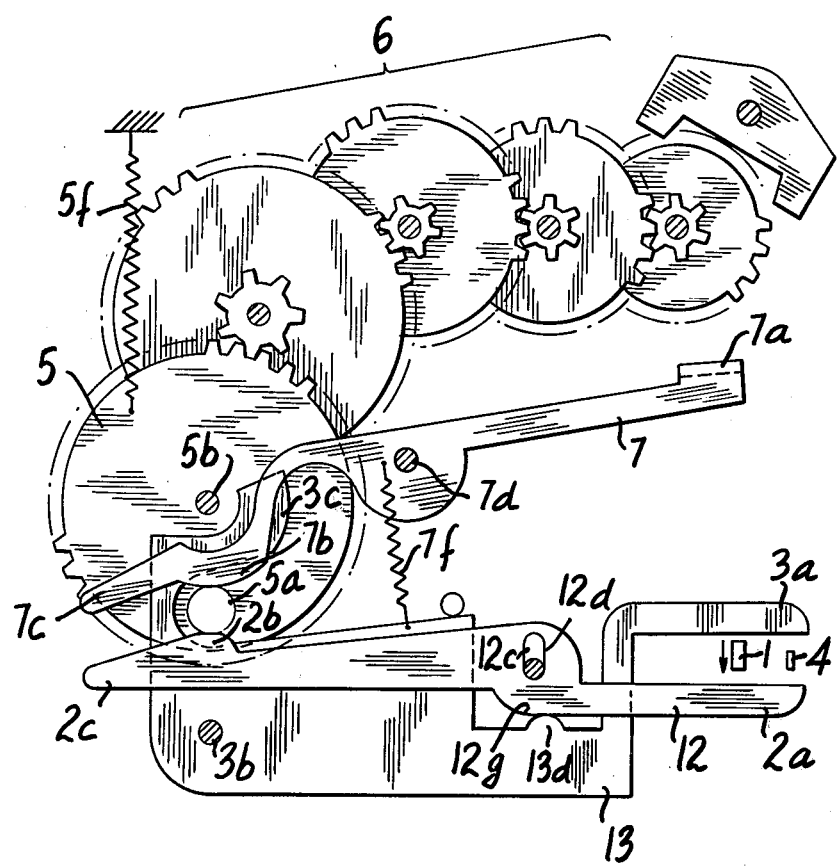
FIG. 3 illustrates a second embodiment of the present invention.

The signal motion to start the stop lever 7 turning clockwise may be performed by directly pushing the stop lever 7 with the operating plate 1. FIG. 3 illustrates a second embodiment of the present invention. The second embodiment is a partial modification of the first embodiment. The interlocking lever 2 and the translating lever 3 of the first embodiment are replaced with an interlocking lever 12 rotatably supported on a base plate (not shown) by means of a slot 12e and a pin 12d and a translating lever 13 additionally provided with a side portion 13d pushed by a side portion 12g of the interlocking lever 12, respectively. The performance of the second embodiment being substantially similar to that of the first embodiment, explanation will be omitted to avoid duplication. Although the interlocking lever 12 pushes the shutter release member 4 in the present embodiment, the shutter release member 4 may be pushed directly by the side portion 12g of the interlocking lever 12.

As explained above, the selftimer device according to the present invention is constructed that the signal motion of the operating member 1 operated by the shutter releasing motion and the signal motion of the pin 5a of the selftimer are combined and converted into a single signal motion to actuate the shutter release member 4 for starting the shutter, therefore it has no detrimental effect on the operation of the shutter as compared with the conventional construction. Furthermore, the productivity is improved as the selftimer is started by a larger stroke of the actuating members thereby eliminating of sophisticated component parts. Still further, this invention provides a selftimer on a camera having excellent shock-proof or vibration-proof properties by the provision of arrangement of the interlocking lever 3 or 13 for pushing the shutter release member 4 and the operating member 1 and arrangement of the pin 5a of the selftimer and the arm 3c of the translating lever 3 in the charged state of the selftimer.

We claim:

1. In a camera shutter of the type having an operating member movable in a given direction during the beginning portion of the shutter release motion and a shutter release member movable in a given direction during a later portion of the shutter release motion for initiating release of the shutter: an actuatable selftimer device having enabled and disenabled states and operable when actuated in the enabled state for performing a selftimer timing operation, and selftimer device including a signal motion member movable from an initial position to another position during the selftimer timing operation; an interlocking member mounted for movement to first and second positions, said interlocking member having a first arm engageable with and driven by said operating member during the course of movement thereof in said given direction to effect movement of interlocking member to said first position to thereby actuate said selftimer device to initiate said selftimer timing operation, and a second arm engageable with and driven by said signal motion member during the final stage of movement thereof from said initial position to said another position to effect movement of said interlocking member to said second position to thereby effect movement of said shutter release member in said given direction to initiate release of the shutter.

2. A camera shutter according to claim 1; further including a movable translating member biased out of engagement with said shutter release member when said interlocking member is in its first position and coacting with and being driven by said interlocking member during movement thereof to its second position to engage with and drive said shutter release member in said given direction.

3. A camera shutter according to claim 2; including means mounting said translating member for pivotal movement in one direction to accordingly drive said shutter release member in said given direction; and means mounting said interlocking member for pivotal movement on said translating member.

4. A camera shutter according to claim 2 or 3; including means operative when said selftimer device is in its enabled state for limiting movement of said translating member to prevent engagement thereof with said shutter release member until at least the terminal portion of said selftimer timing operation thereby preventing erroneous actuation of said shutter release member.

5. A camera shutter according to claim 4; wherein said means for limiting movement of said translating member comprises a translating member arm configured so as to engage with said signal motion member during movement thereof from said initial position toward said another position thereby limiting movement of said translating member and preventing engagement thereof with said shutter release member until at least the terminal portion of said selftimer timing operation.

6. A camera shutter according to claim 4; wherein when said selftimer device is its enabled state, the distance between said translating member and operating member, in the direction of movement of said translating member, is less than the distance between said translating member and shutter release member thereby preventing erroneous actuation of said shutter release member by movement of said translating member due to the presence of said operating member.

* * * * *